(12) United States Patent
Schneider et al.

(10) Patent No.: US 9,211,814 B2
(45) Date of Patent: Dec. 15, 2015

(54) SEAT ADJUSTING MECHANSIM FOR VEHICLE

(71) Applicant: Polaris Industries Inc., Medina, MN (US)

(72) Inventors: Michael D. Schneider, Dalbo, MN (US); Daniel P. Strobach, Osceola, WI (US); Phillip B. Swain, Woodbury, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/103,600

(22) Filed: Dec. 11, 2013

(65) Prior Publication Data

US 2014/0167483 A1 Jun. 19, 2014

Related U.S. Application Data

(60) Provisional application No. 61/736,966, filed on Dec. 13, 2012.

(51) Int. Cl.
*B60N 2/07* (2006.01)
*B60N 2/06* (2006.01)
*B60N 2/08* (2006.01)

(52) U.S. Cl.
CPC ............... *B60N 2/0722* (2013.01); *B60N 2/06* (2013.01); *B60N 2/0825* (2013.01); *B60N 2/0843* (2013.01)

(58) Field of Classification Search
CPC ...... B60N 2/06; B60N 2/0722; B60N 2/0825; B60N 2/0843
USPC ........... 297/344.1; 248/429; 296/65.13, 65.15
See application file for complete search history.

(56) References Cited

U.S. PATENT DOCUMENTS

| | | | | |
|---|---|---|---|---|
| 4,384,701 | A * | 5/1983 | Barley | 296/65.02 |
| 5,171,055 | A | 12/1992 | Hutchison et al. | |
| 5,234,189 | A * | 8/1993 | Myers | 296/65.13 |
| 5,765,802 | A * | 6/1998 | Bostrom et al. | 248/429 |
| 5,884,887 | A * | 3/1999 | Garelick et al. | 297/344.1 |
| 6,010,194 | A * | 1/2000 | Cykon | 297/344.1 |
| 6,079,786 | A * | 6/2000 | Kirkland et al. | 297/344.24 |
| 6,945,505 | B2 | 9/2005 | Hohnl et al. | |
| 6,986,550 | B2 * | 1/2006 | Gevaert et al. | 297/344.1 |
| 7,478,861 | B1 | 1/2009 | Kubota | |
| 7,490,905 | B2 * | 2/2009 | Ritter et al. | 297/344.11 |
| 7,648,115 | B2 | 1/2010 | Lambert et al. | |
| 8,632,043 | B2 * | 1/2014 | Dahlbacka et al. | 248/429 |

* cited by examiner

*Primary Examiner* — Peter Brown
(74) *Attorney, Agent, or Firm* — Faegre Baker Daniels LLP

(57) ABSTRACT

The present invention relates to a seat adjustment mechanism for a seat, for example a seat for all terrain vehicles having at least a pair of laterally spaced apart seats.

36 Claims, 12 Drawing Sheets

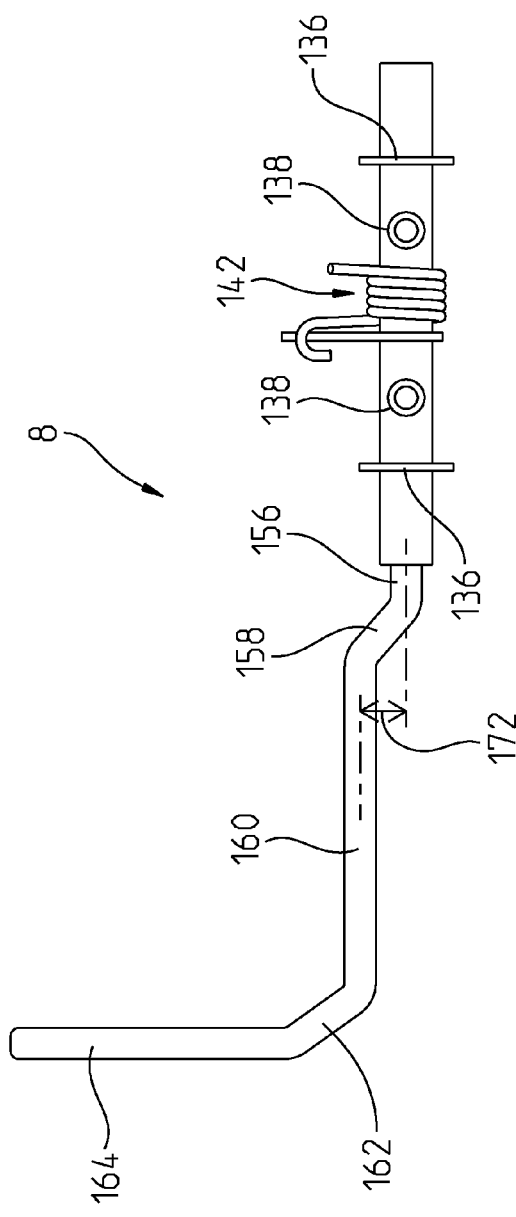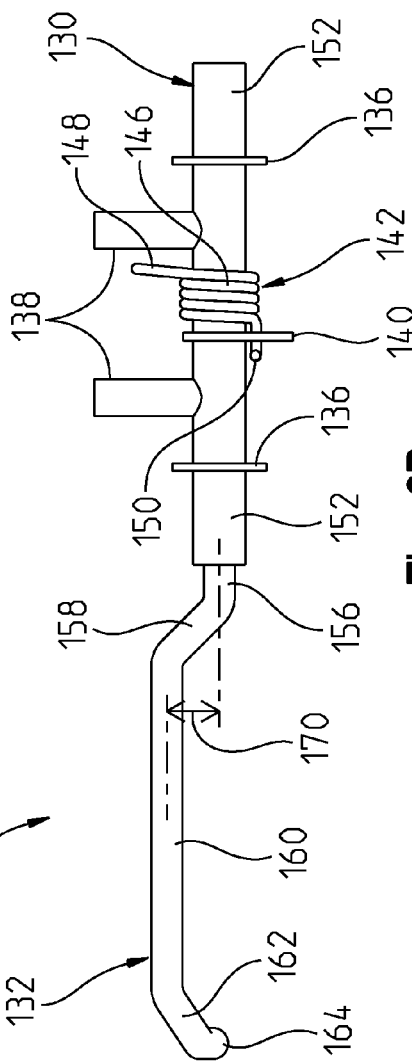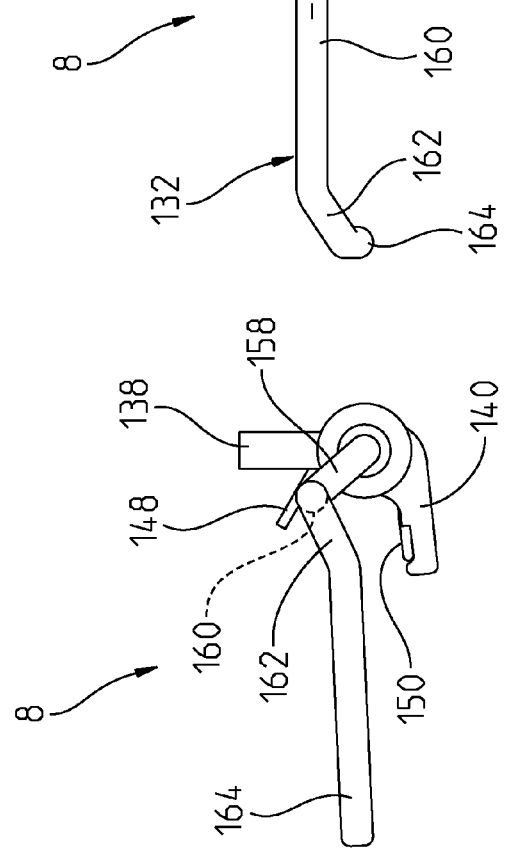

SEAT ADJUSTING MECHANSIM FOR VEHICLE

RELATED APPLICATIONS

This application claims priority from U.S. provisional Ser. No. 61/736,966 filed Dec. 13, 2012, the subject matter of which is incorporated herein by reference in its entirety.

FIELD OF THE DISCLOSURE

The present invention relates to a seat adjusting mechanism and more particularly to a mechanism allowing longitudinal adjustment for a vehicle seat.

BACKGROUND

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint. The seats are typically removable from the vehicle for cleaning the vehicle, as well as for servicing the vehicle.

SUMMARY

According to an illustrative embodiment of the present disclosure, a seat adjustment mechanism comprises a base member having an upper wall, and a cavity positioned below the upper wall; an adjustment mechanism is positioned within an envelope of the cavity, and is movable longitudinally relative to the base member, the adjustment mechanism having a coupling mechanism protruding though at least a portion of the base member and movable therewith. A locking mechanism has a locked and unlocked position, allowing the adjustment mechanism to be longitudinally movable relative to the base member when in the unlocked position, and locked relative to the base member when in the locked position.

In another embodiment, a seat adjustment mechanism comprises a base member having a perimetral wall and an upper wall supported by the perimetral wall, a cavity is positioned below the upper wall, and an opening is positioned vertically above the perimetral wall and communicates with the cavity. An adjustment mechanism has a movable portion and an adjusting and locking mechanism. The movable portion is positioned within the cavity, and at least a portion of the adjusting and locking mechanism protrudes through the opening. The adjustment mechanism further comprises a coupling mechanism protruding though at least a portion of the base member and is movable with the adjustment mechanism. The movable portion is movable longitudinally relative to the base member; and the adjusting and locking mechanism has a locked and unlocked position, allowing the adjustment mechanism to be longitudinally movable relative to the base member when in the unlocked position, and locked relative to the base member when in the locked position.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 6A shows a top view of the adjustment lever;

FIG. 6B shows a left side view of the adjustment lever;

FIG. 6C shows a front end view of the adjustment lever;

Figure 1:
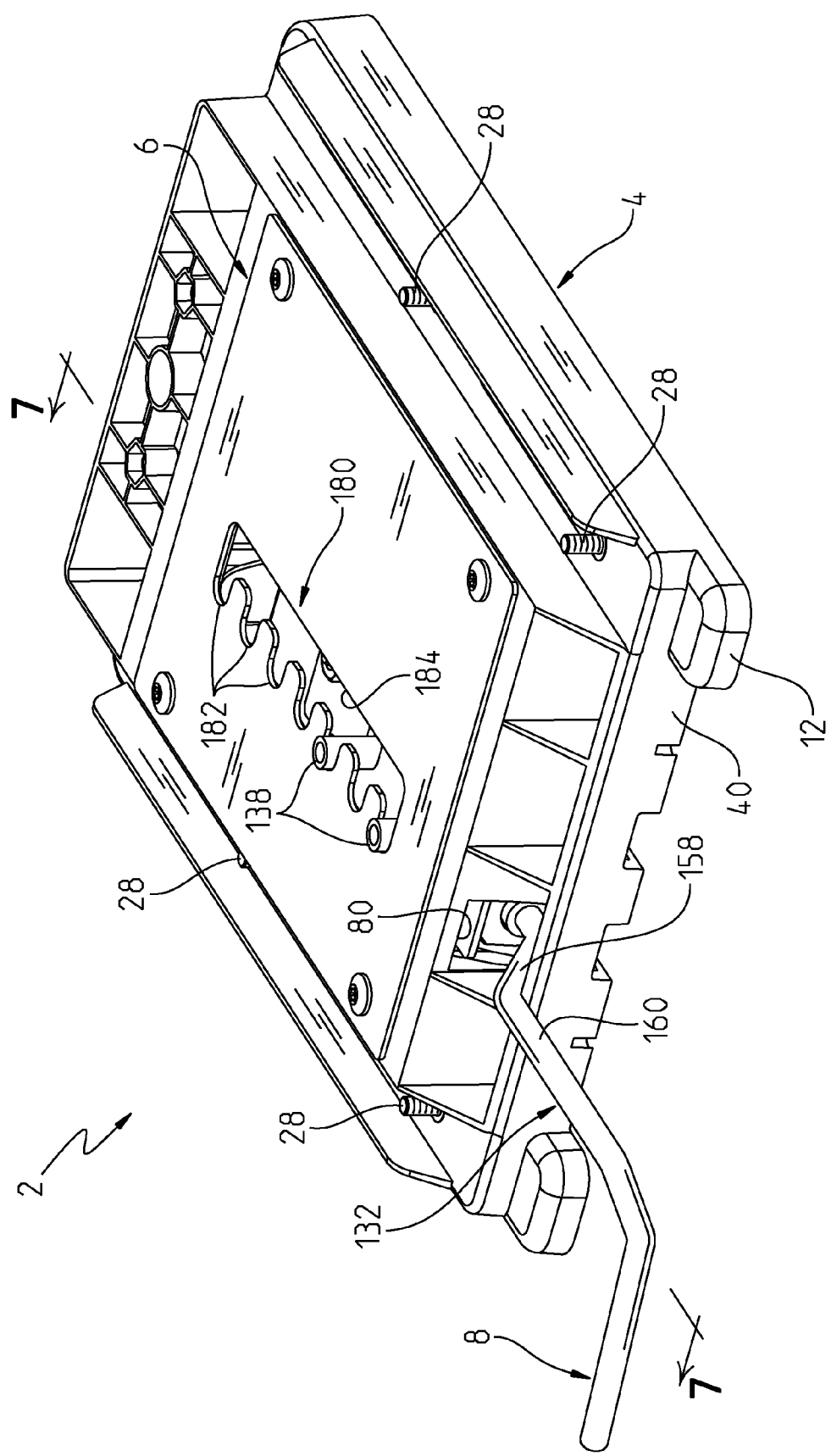
FIG. 1 shows a left front perspective view of the seat adjustment mechanism of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to UVs, certain features described herein may be applied to other applications such as ATVs, snowmobiles, motorcycles, mopeds, etc.

Figure 2:
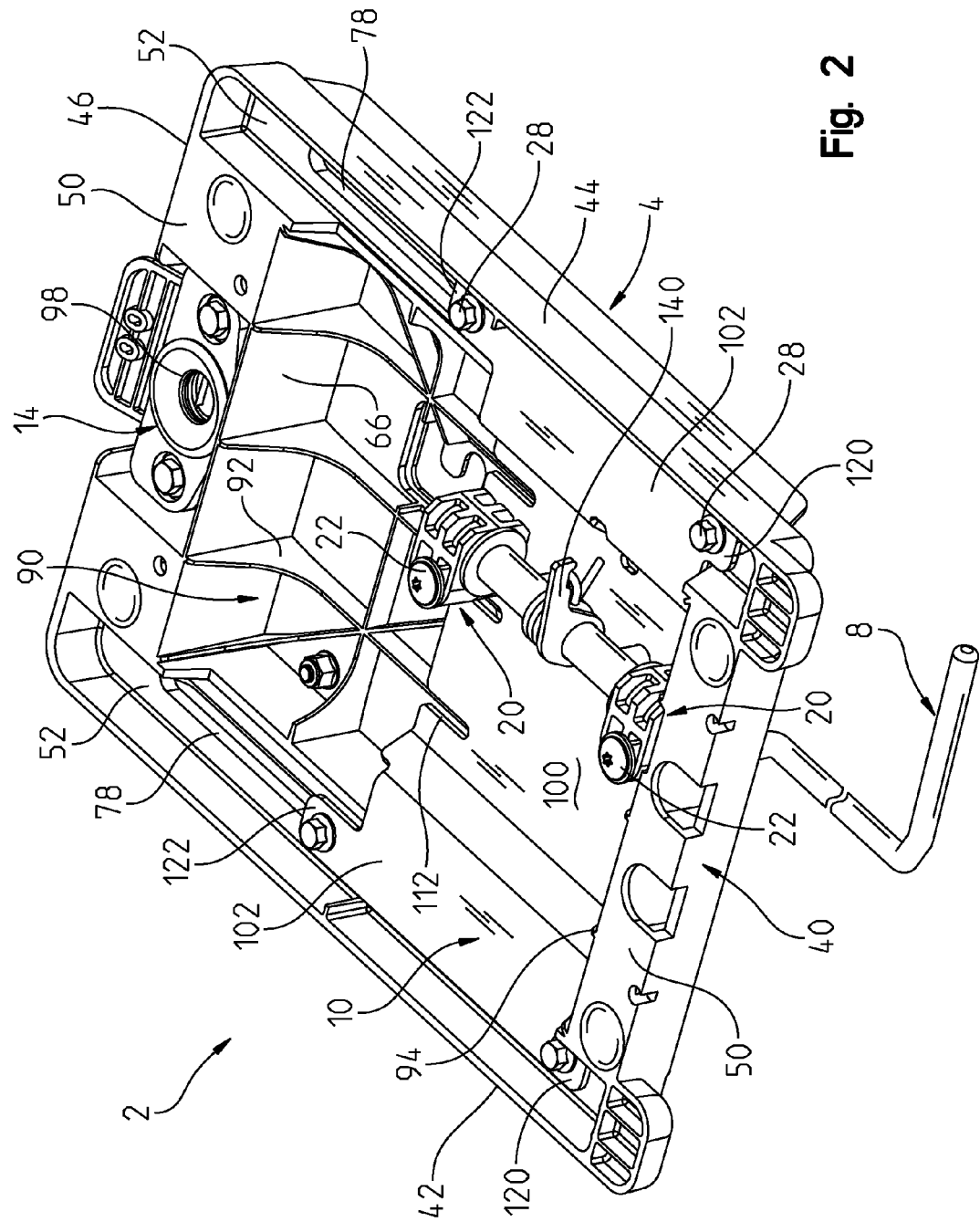
FIG. 2 shows an underside perspective view of the seat adjustment mechanism of FIG. 1.

With reference first to FIGS. 1 and 2, the seat adjustment mechanism of the present disclosure will be described. The seat adjustment mechanism could be utilized on vehicles such as those described in U.S. Pat. No. 7,819,220, and/or in our U.S. pending applications Ser. No. 12/849,480 filed Aug. 3, 2010; and Ser. No. 13/370,139 filed Feb. 9, 2012, the complete disclosures of which are incorporated herein by reference.

With reference still to FIGS. 1 and 2, the seat adjustment mechanism is shown generally at 2 and includes base member 4, upper plate 6, adjustment lever 8 and a movable portion shown as a sliding plate 10 (FIG. 2). It should be appreciated that a seat (not shown) could be coupled directly to the seat adjustment mechanism 2, and in particular to sliding plate 10, for longitudinal movement of the seat relative to a vehicle in which the seat is mounted, as will be described in greater detail herein. It should also be appreciated that base member 4 includes locking elements 12 in the form of protruding feet which are profiled to grasp a counter-locking element in the vehicle, and a locking latch 14 (FIG. 2) which locks the seat and the seat adjusting mechanism to the vehicle by way of an upstanding post in the vehicle.

Additional details of the engagement between base member 4 and the upstanding post are disclosed in pending U.S. patent application Ser. No. 12/246,948, filed Oct. 7, 2008; and additional details of the engagement between base member 4 and the vehicle are disclosed in pending U.S. patent application Ser. No. 61/712,396 filed Oct. 11, 2012; the complete disclosures of which are expressly incorporated by reference herein.

Figure 3:
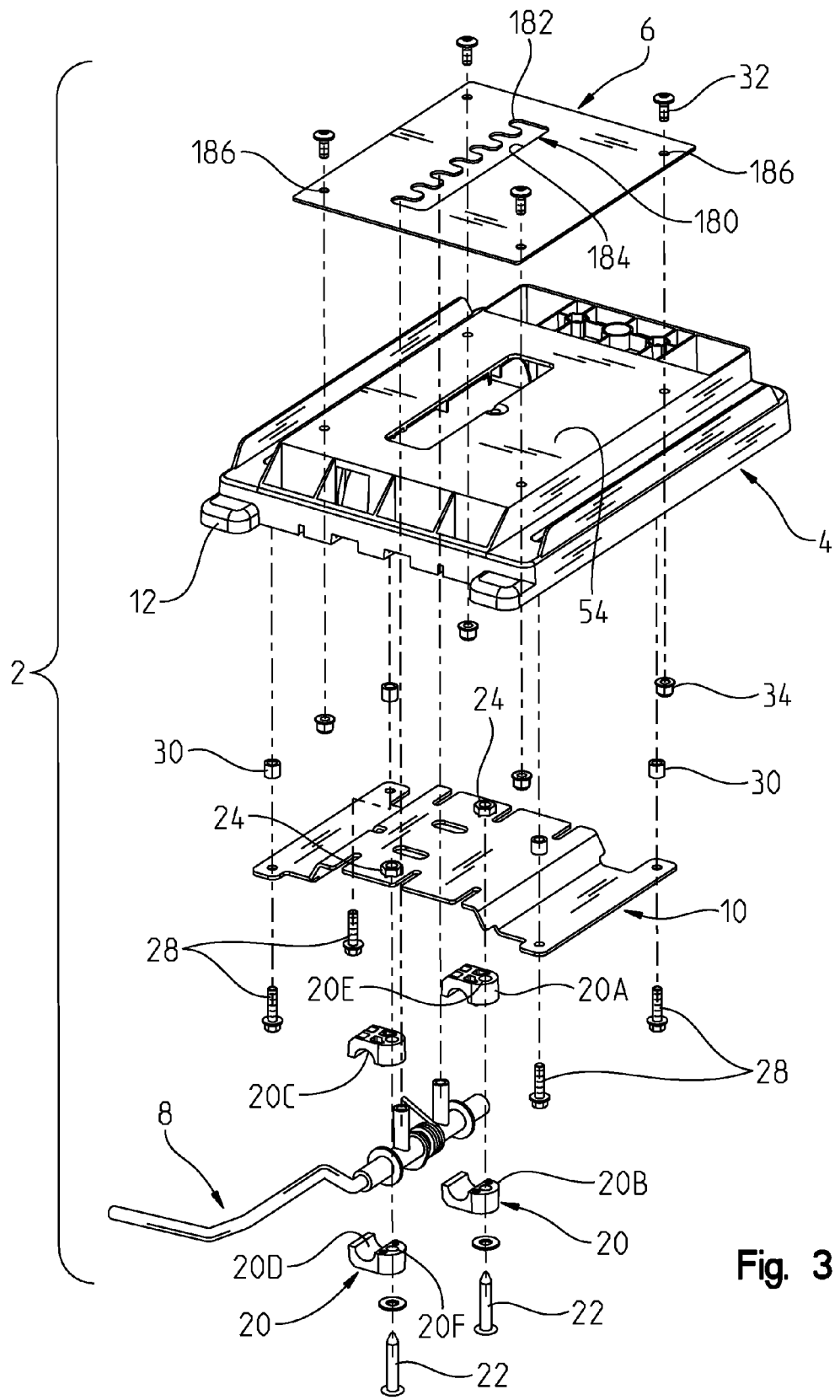
FIG. 3 shows an exploded view of the seat adjustment mechanism of FIG. 1.

With reference now to FIG. 3, the remaining components of the seat adjustment mechanism include bearing clamps 20 including clamp halves 20A and 20B. Bearing clamps include semi-cylindrical surfaces 20C and 20D; and mounting apertures 20E and 20F. Semi-cylindrical surfaces 20C and 20D cooperate to define a cylindrical surface and mounting apertures 20E and 20F cooperate to define a through-hole through the bearing clamps 20, as more fully described herein. Bearing clamps 20 clamp the adjustment lever 8 to sliding plate 10 by way of fasteners, such as bolts 22 and nuts 24, as described herein. Further components include fasteners 28, sleeves 30; and fasteners 32, 34 as further described herein.

Figure 4:
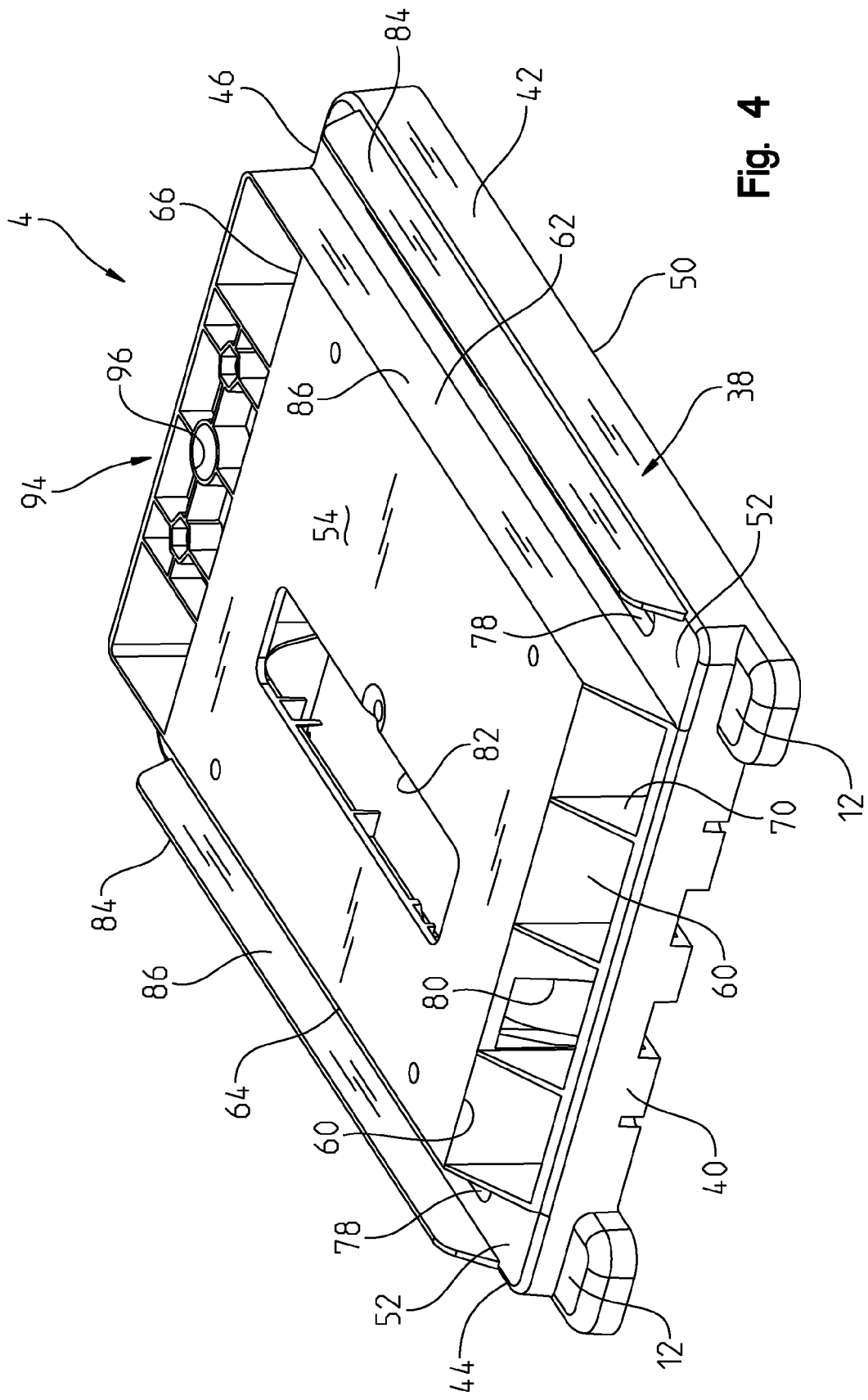
FIG. 4 shows a left front perspective view of the base member.

With reference now to FIGS. 2 and 4, base member 4 will be described in greater detail. As shown, base member 4 includes a generally rectangular body comprised of a perimetral wall 38 (FIG. 4) having a front wall 40 from which locking elements 12 extend; side walls 42, 44 and rear wall 46. Base member 4 also includes a base and planar surface 50 which defines a flat mounting surface for the seat. Base member 4 also includes longitudinally extending walls 52 and an upper wall 54. As shown, longitudinally extending walls 52 are positioned vertically above base surface 50 but positioned below upper wall 54. Upper wall 54 is supported by way of a recessed wall 60, side walls 62, 64 and rear wall 66. Rigidifying webs 70 couple together front wall 40, upper wall 54 and recessed wall 60. Longitudinally extending walls 52 further include elongate slots 78 which protrude through walls 52 to an underside of the base member 4, as shown best in FIG. 2. With reference again to FIG. 4, base member 4 further includes an opening or window 80 through recessed wall 60 and an access opening 82 through upper wall 54. Finally, base member 4 includes outer walls 84, which together with walls 52 and sidewalls 62, 64, define channels 86.

With reference to FIG. 2, seat adjustment mechanism 2 is shown from an underside and base member 4 includes a hollow section defining an underside cavity at 90 sufficient to receive sliding plate 10, and a portion of adjustment lever 8. Base member 4 includes latch receiving area 94 (FIG. 4) including an opening at 96 for receiving the post on the vehicle (not shown) and corresponding with latch opening 98 (FIG. 2) of locking latch 14.

Figure 5:
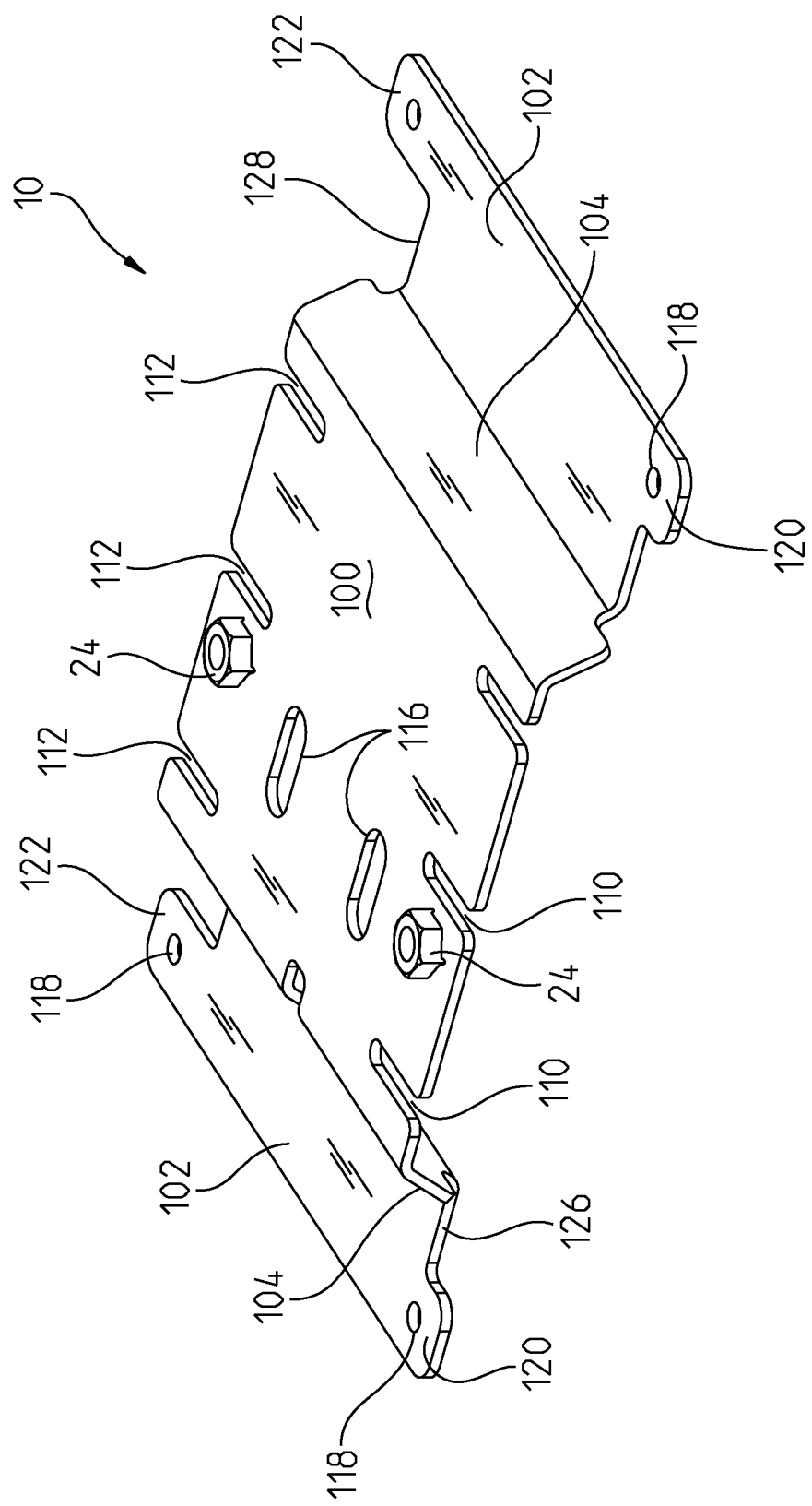
FIG. 5 shows a left front perspective view of the upper plate.

With reference now to FIG. 5, sliding plate 10 includes an upper plate portion 100, sliding rails 102 and connecting portions 104. Upper plate portion 100 includes front relief slots 110, rear relief slots 112 and transverse slots 116, all of which are described herein in detail. Slide rails 102 include mounting apertures 118, front feet portions 120 and rear feet portions 122, where front feet portions 120 extend forward from a front edge 126 and where rear feet 122 extend rearward from rear edge 128. As shown, fasteners 24 are coupled directly to upper plate portion 100, and while not shown, an aperture extends through upper plate portion 100 and aligns with fasteners 24.

With reference now to FIGS. 6A-6C, the adjustment lever 8 is described in greater detail. As shown, adjustment lever 8 generally includes a shaft portion 130 and a handle portion 132. While adjustment lever 8 could be comprised of a single component, as described, adjustment lever 8 is an assembly or combination of multiple elements bonded together. As shown, shaft portion 130 is a cylinder slidably received over handle portion 132. Shaft portion 130 includes thrust washers 136, locating pegs 138, torsion arm 140 and torsion spring 142. As shown, torsion spring 142 includes coiled portion 146, extending spring finger 148 and oppositely extending spring finger 150. Bearing surfaces 152 (FIG. 6B) are defined on the outer ends of shaft portion 130 and adjacent to thrust washers 136.

As shown, handle portion 132 includes a central crank portion 156, angled portion 158, elongate portion 160, angled portion 162 and gripping portion 164. As shown, crank portion 156 is concentric with shaft portion 130. Angled portion 158 shifts the elongate portion 160 both vertically and laterally as best shown in FIG. 6C. As shown, angled portion 158 shifts the elongate portion 160 vertically by an amount 170 (FIG. 6B) and laterally by an amount 172 (FIG. 6A), relative to a centerline of the shaft portion 130. As shown best in FIG. 6C, angled portion 162 angles gripping portion 164 downwardly to a generally horizontal position adjacent to a centerline of crank portion 156.

With reference again to FIGS. 1 and 3, upper plate 6 includes a locating slot 180 having transverse locating slots 182 and a longitudinal slot 184, communicating with the plurality of transverse slots 182 as described herein. Upper plate also includes mounting apertures 186 (FIG. 3). With the components as described above, the assembly of the seat adjustment mechanism will now be described.

With reference now to FIGS. 2 and 3, the assembly of the seat adjustment mechanism will be described. With reference first to FIG. 3, bearing clamps 20 are positioned on bearing surfaces 152 (FIG. 6B) of shaft portion 130 adjacent to thrust washers 136, whereupon fasteners 22 are positioned through bearing clamps 20, though upper plate portion 100 and into fasteners 24, thereby coupling lever 8 to slidable plate 10. It should be appreciated that semi-cylindrical surfaces 20C and 20D define an inner cylindrical surface slightly larger than the outer diameter of bearing surfaces 152 of shaft portion 130, allowing the adjustment lever to freely rotate relative to sliding plate 10.

As mounted, locating pegs 138 (FIG. 6B) are positioned through transverse slots 116 of sliding plate 10 (FIG. 5). It should be appreciated that torsion spring 142 (FIG. 6B) is torqued upon mounting of lever 8 to sliding plate 10. As extending spring finger 148 is depressed against an underside of plate 10, a downward force is applied to torsion arm 140 (FIG. 6C) causing a counterclockwise moment on adjustment lever 8, as viewed in FIG. 6C. Fasteners 28 may now be applied through apertures 118 of sliding plate 10 and sleeves 30 are applied to an upper side of plate 10 over fasteners 28. This combination of elements may be applied to base member 4 with fasteners 28 and sleeves 30 protruding through slots 78, as best shown in FIGS. 1 and 2. Thus as best shown in FIG. 2, slide rails 102 are movable forwardly and rearwardly along wall 52 with fasteners 28 sliding forwardly and rearwardly within slot 78. It should also be understood that sleeves 230 protrude slightly higher than an upper surface of walls 52. Fasteners 28 and sleeves 30 define a coupling mechanism for a seat as described herein.

Plate 6 may now be applied to top wall 54 of base member 4 such that locating slot 180 overlaps locating pegs 138. Plate 6 is held by way of fasteners 32, 34 through apertures 186 of upper plate 6 to top wall 54. As shown best in FIG. 1, bent portion 158 of handle portion 132 allows elongate portion 160 to be positioned up and over wall 40 and allows room for elongate portion 160 to move longitudinally, forwardly and rearwardly as described herein.

Figure 7:
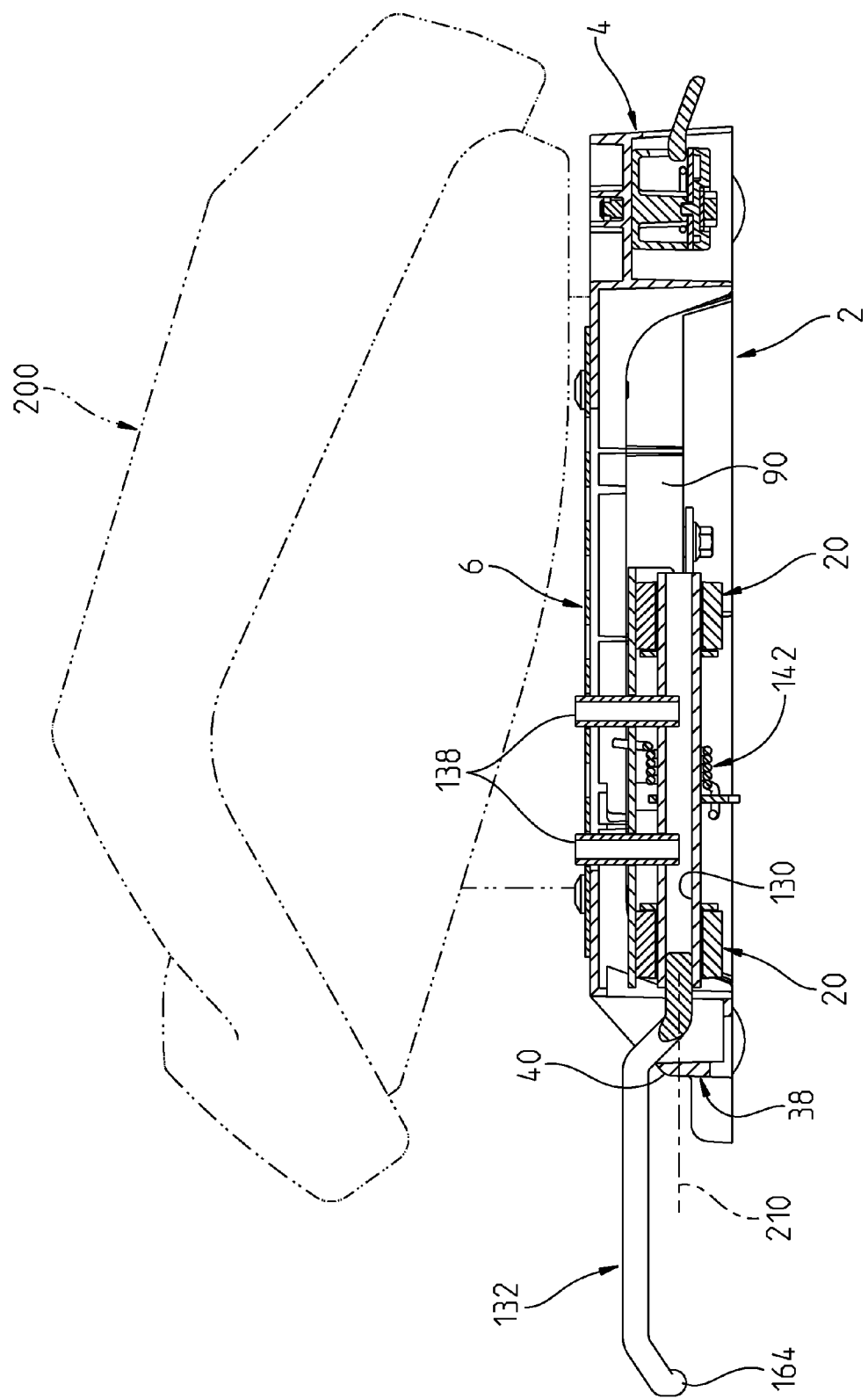
FIG. 7 shows a cross sectional view through lines 7-7 of FIG. 1, showing a seat bottom positioned in phantom view.
Figure 8:
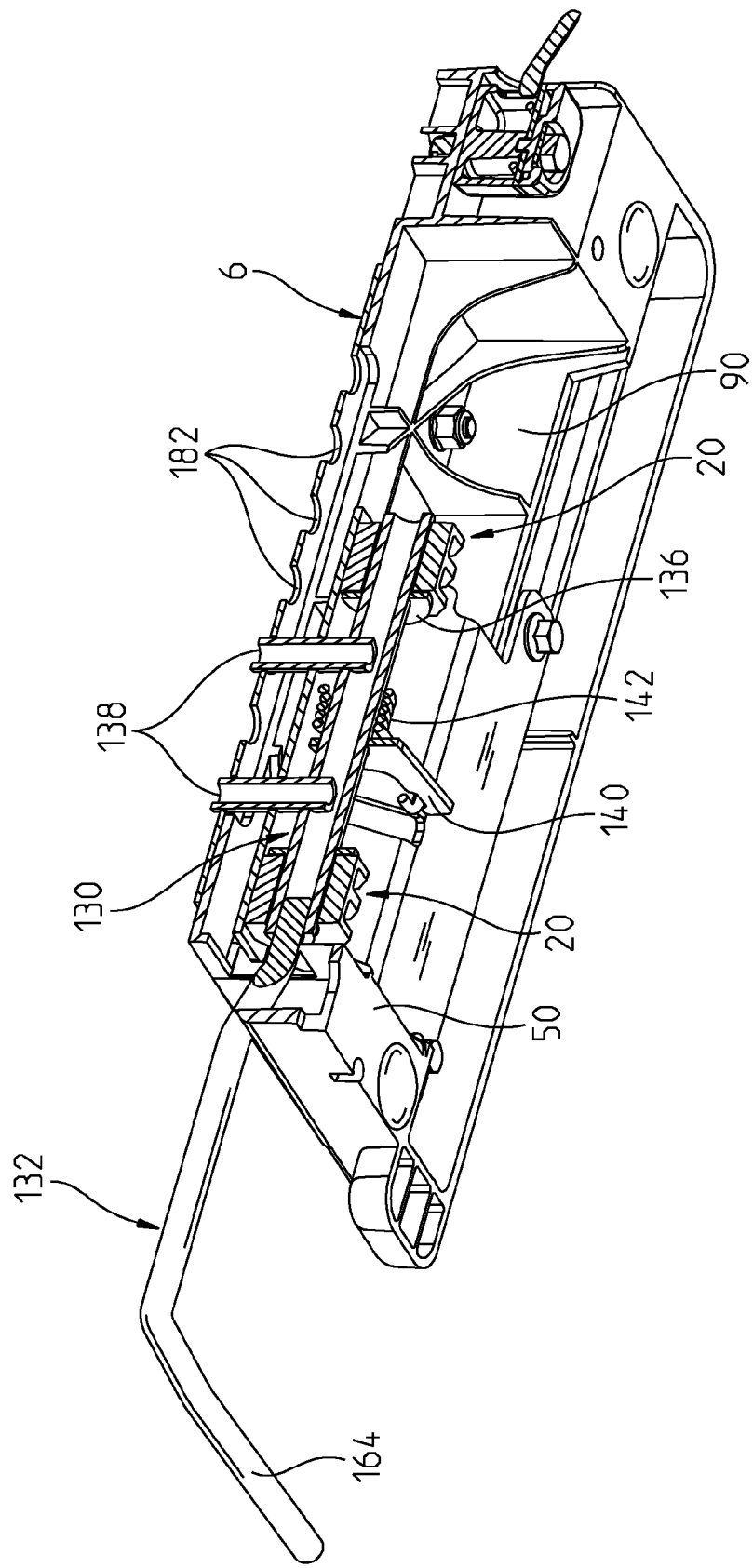
FIG. 8 shows a cross sectional view similar to that of FIG. 7, but in an underside perspective view.

Seat adjustment mechanism may now be applied to the bottom of a seat. The bottom of the seat assembly includes a bracket having mounting elements which overlie fasteners 28 and to which they couple. The brackets are more clearly shown and described in our pending U.S. patent application Ser. No. 61/712,396 filed Oct. 11, 2012, the complete disclosures of which is expressly incorporated by reference herein. The bracket may be tightened down to a point where the brackets contact the sleeves 30, which prevents the seat brackets from being fastened down to walls 52. Rather, the seat brackets slide within channels 86 (FIG. 4). Thus with pegs 138 in the forward most position, a forward most position of the seat is defined. It should be appreciated that FIG. 7 shows the forward most position of the seat adjustment mechanism 2. FIG. 7 also shows in phantom a seat bottom 200 in registry with the seat adjustment mechanism 2, where seat bottom 200 is located in its forward most position.

Figure 9:
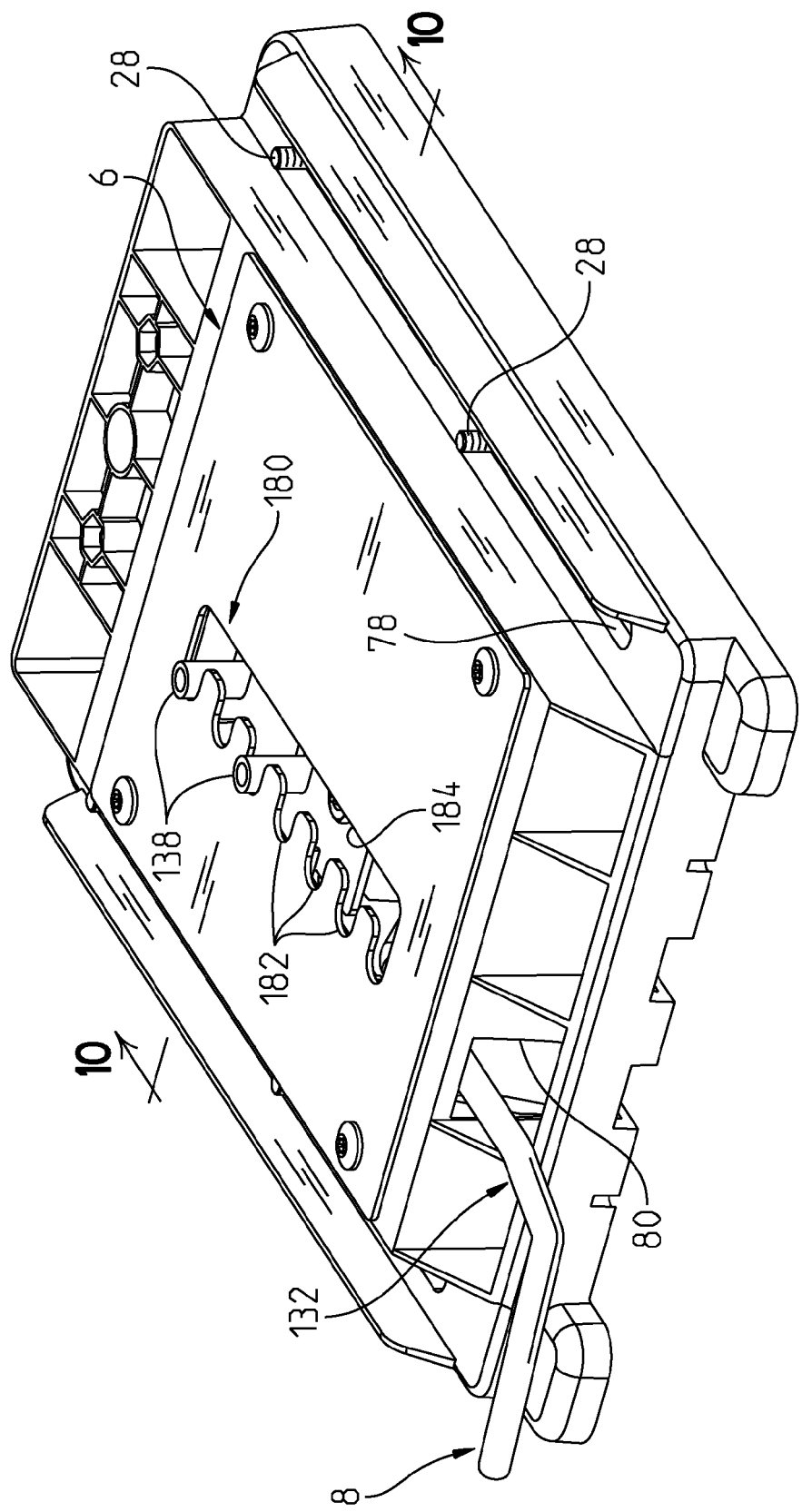
FIG. 9 shows a view of the seat adjustment mechanism similar to that of FIG. 1, showing the adjustment lever in the rearward most position.
Figure 10:
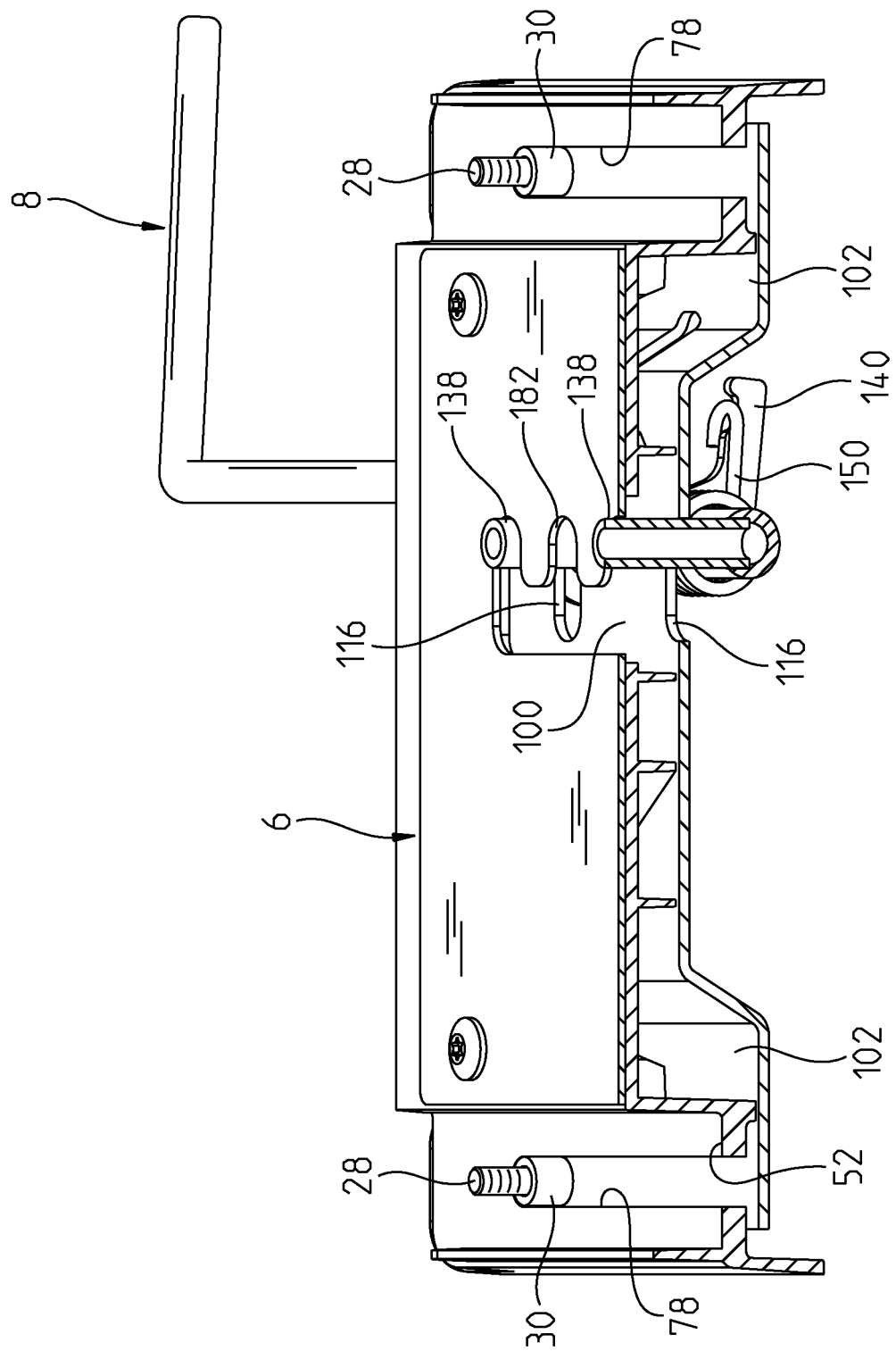
FIG. 10 shows a cross sectional view through lines 10-10 of FIG. 9.
Figure 11:
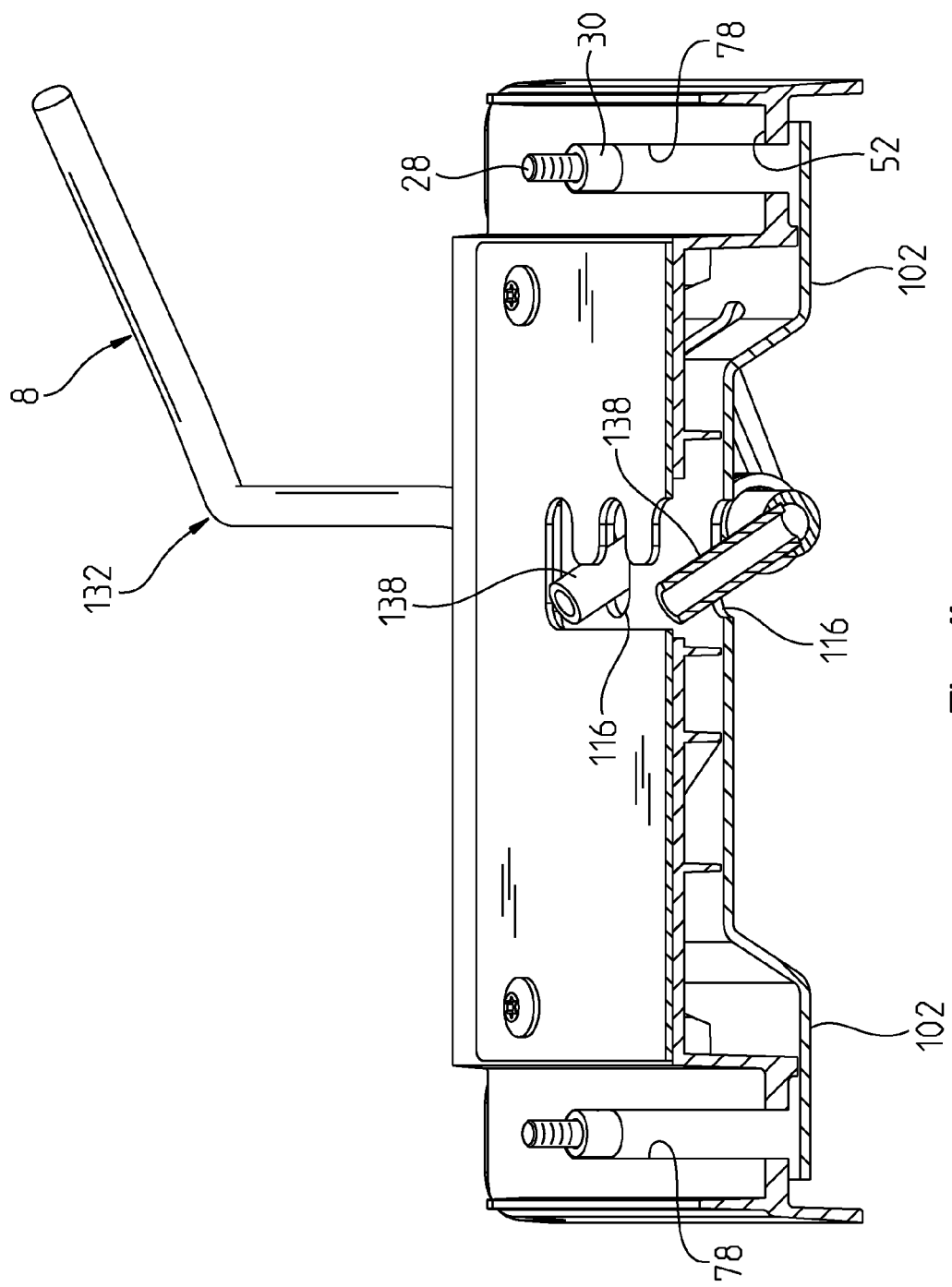
FIG. 11 shows a view of the seat adjustment mechanism similar to that of FIG. 10, showing the adjustment lever rotated open.
Figure 12:
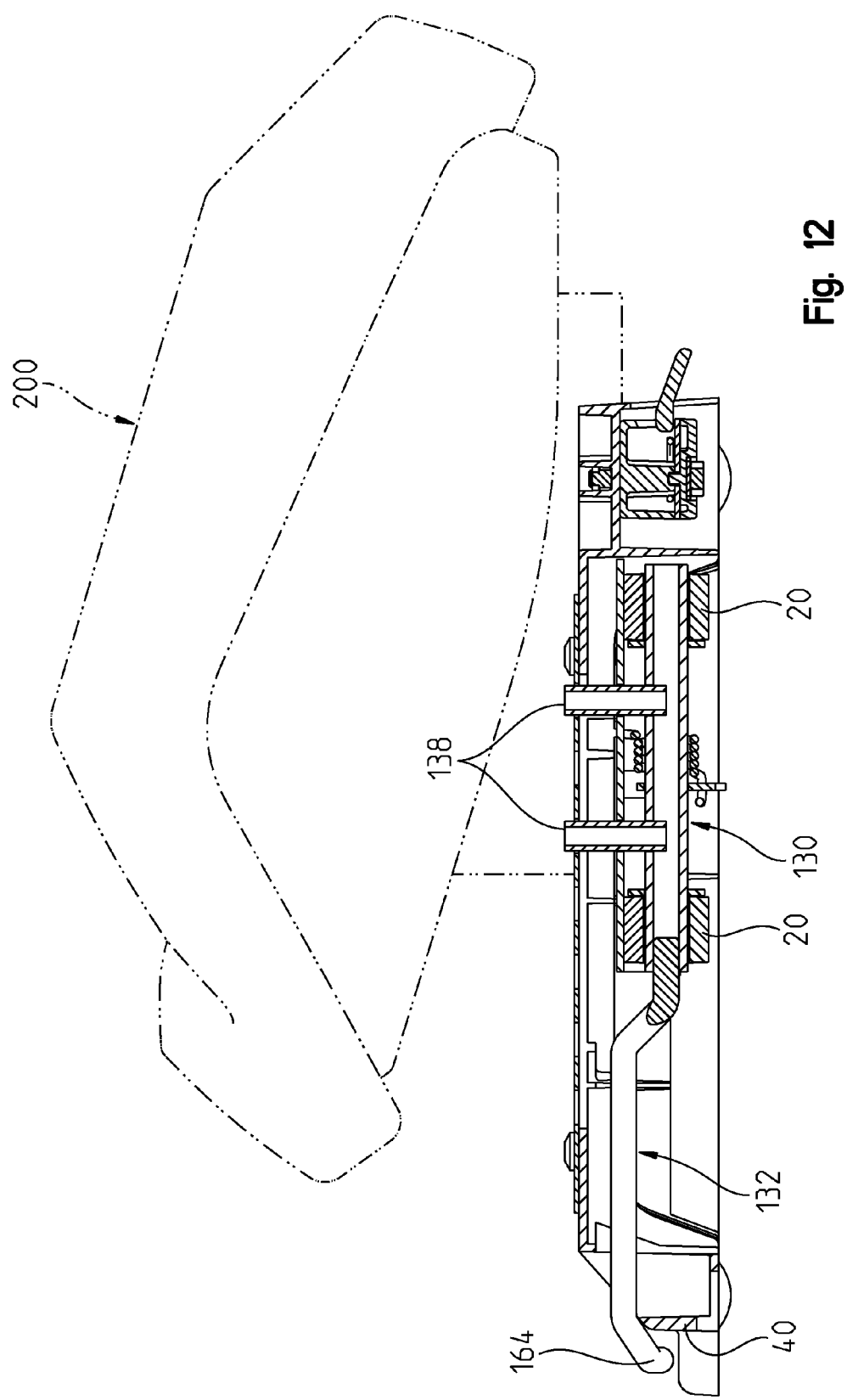
FIG. 12 shows a cross sectional view of the seat adjustment mechanism, showing the seat bottom positioned in phantom view, with the adjustment lever and the seat bottom in the rearward most position.

When the operator desires to move the seat rearward, for example to the position of FIGS. 9 and 12, the adjustment lever 8 is moved from the position shown in FIG. 10 to the position shown in FIG. 11. As shown in FIG. 11, locating pegs 138 are clear of their locating slots 182, and are positioned within the longitudinal slot 184. At this point either the handle portion 132 can be pushed rearwardly, or the operator can push against the seat back sliding the seat bottom 200 rearwardly. When the seat moves to the rearward most position, the operator releases handle portion 132 and pegs 138 are resiliently biased by way of torsion spring 142 into the returned position of FIG. 9.

Due to the geometry of the seat adjustment mechanism, the profile or envelope of the base member 4 has not been increased; particularly in the vertical dimension. As the location of the seat has an effect on the center of gravity (due to the weight of the driver and/or passenger) the seat adjustment mechanism has been added without negatively affecting the center of gravity; that is, without increasing the vertical dimension of the center of gravity relative to the ground or to the vehicle. This is accomplished by providing the cavity 90 on an underside of the base member 4 which receives the adjustment lever 8 and sliding plate 10 within an envelope of the base member 4.

Moreover as best shown in FIG. 2, sliding plate 10 and lever 8 are movable within the cavity 90 forwardly and rearwardly between the two extreme positions. That is, sliding rails 102 are positioned adjacent to intermediate wall 52 with fasteners 28 positioned within grooves 78. Feet portions 122 can slide past wall 66 and upper wall 100 can be received adjacent to wall 66 due to relief slots 112 receiving webs 92. In a similar way, relief slots 110 (FIG. 5) receive webs 94 when in the forwardmost position. Furthermore due to the geometry of the lever 8, the handle portion 132 protrudes through the window 80 and up and over front wall 40. More particularly, and as shown in FIG. 7, the longitudinal axis 210 of the shaft portion 130 is below front wall portion 40 of the perimetral wall 38, and the handle portion 132 is angled up and over the perimetral wall 38. Thus, the rigidity of base member 4 is retained intact even with the introduction of the aperture 80.

Finally, the seat adjustment mechanism does not interfere with the seat and particularly with the seat bottom. With reference again to FIGS. 10 and 11, locating pegs 138 are just slightly above upper plate 6 when in the fully locked position and rotate down and away from the plate 6 when in the rotated position of FIG. 11. Thus the locating pegs 138 do not interfere with the seat bottom 200, and the seat bottom 200 does not interfere with the movement of locating pegs 138. Nor does the handle interfere with the seat bottom, as the handle portion moves with seat bottom, as shown in FIGS. 7 and 12. That is, the gripping portion 164 is always slightly forward of the forward most part of the seat bottom 200, allowing the gripping portion 164 to the position of FIG. 10.

It should be appreciated that other embodiments may be derived from the above mentioned disclosure. For example, upper plate 6 may be eliminated if the locating slot 180 is incorporated directly into the upper wall 54 of base member 4.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seat adjustment mechanism, comprising:
a base member having an upper wall, and a cavity positioned below the upper wall;
an adjustment mechanism comprised of a movable plate being positioned within an envelope of the cavity, and being movable longitudinally relative to the base member, the movable plate having an upper plate portion and sliding rails, where the sliding rails are positioned vertically lower than the upper plate portion, the adjustment mechanism further comprising a coupling mechanism protruding though at least a portion of the base member, the coupling mechanism being coupled to and movable with the movable plate, and the coupling mechanism defining coupling points for attachment to a seat, the coupling points being lower than that the upper wall of the base member and wherein the coupling mechanism is defined by fasteners coupled to the sliding rails; and
an adjusting and locking mechanism having a locked and unlocked position, allowing the adjustment mechanism to be longitudinally movable relative to the base member when in the unlocked position, and locked relative to the base member when in the locked position.

2. The seat adjustment mechanism of claim 1, wherein the movable plate is defined by a sliding plate.

3. The seat adjustment mechanism of claim 2, wherein the adjusting and locking mechanism comprises an adjustment lever coupled to the sliding plate.

4. The seat adjustment mechanism of claim 3, wherein the adjustment lever is coupled to a lower side of the sliding plate, and is movable with the sliding plate.

5. The seat adjustment mechanism of claim 4, wherein the adjustment lever comprises a shaft portion and a handle portion.

6. The seat adjustment mechanism of claim 5, wherein the shaft portion is coupled to the lower side of the sliding plate and the handle portion protrudes through the base member.

7. The seat adjustment mechanism of claim 6, wherein the base member includes a front lower wall and an opening is positioned vertically above the front lower wall, and the handle portion protrudes through the opening.

8. The seat adjustment mechanism of claim 6, wherein the shaft portion is rotatable about a longitudinal axis and the handle portion includes a gripping portion which is generally perpendicular to the shaft portion.

9. The seat adjustment mechanism of claim 8, wherein the shaft portion comprises first locking elements which locate and lock the shaft portion relative to the base member.

10. The seat adjustment mechanism of claim 9, wherein the base member further comprises second locking elements cooperable with the first locking elements.

11. The seat adjustment mechanism of claim 10, wherein the first locking elements comprise one or more locating pegs on the shaft portion and the second locking elements comprise a locating slot having a longitudinal slot portion, and a plurality of transverse slot portions; the shaft portion being rotatable to a position where the locating pegs align with the longitudinal slot portion, whereupon the shaft is longitudinally movable relative to the base member, and the shaft being rotatable to a position where the locating pegs align with the transverse slot portions, shaft portion is fixed relative to the base member.

12. A seat adjustment mechanism, comprising:
a base member having a perimetral wall and an upper wall supported by the perimetral wall, a cavity positioned below the upper wall, and an opening positioned vertically above the perimetral wall and communicating with the cavity;
an adjustment mechanism comprised of a sliding plate and an adjusting and locking mechanism, the sliding plate being positioned within the cavity, and the adjusting and locking mechanism comprising an adjustment lever coupled to a lower side of the sliding plate and is movable with the sliding plate, the adjustment lever comprising a shaft portion and a handle portion, where at least a portion of the adjusting and locking mechanism protrudes through the opening, the shaft portion is rotatable about a longitudinal axis, wherein the longitudinal axis is below the perimetral wall, and the handle portion is angled up and over the perimetral wall;
the adjustment mechanism further comprising a coupling mechanism protruding though at least a portion of the base member and is movable with the adjustment mechanism, wherein the sliding plate is movable longitudinally relative to the base member; and
the adjusting and locking mechanism has a locked and unlocked position, allowing the adjustment mechanism to be longitudinally movable relative to the base member when in the unlocked position, and locked relative to the base member when in the locked position.

13. The seat adjustment mechanism of claim 12, wherein the shaft portion is coupled to the lower side of the sliding plate and the handle portion protrudes through the base member.

14. The seat adjustment mechanism of claim 12, wherein the perimetral wall includes a front lower wall and the opening is positioned vertically above the front lower wall, and the handle portion protrudes through the opening.

15. The seat adjustment mechanism of claim 12, wherein the handle portion includes a gripping portion which is generally perpendicular to the shaft portion.

16. The seat adjustment mechanism of claim 12, wherein the shaft portion comprises first locking elements which locate and lock the shaft portion relative to the base member.

17. The seat adjustment mechanism of claim 16, wherein the base member further comprises second locking elements cooperable with the first locking elements.

18. The seat adjustment mechanism of claim 17, wherein the first locking elements comprise one or more locating pegs on the shaft portion and the second locking elements comprise a locating slot having a longitudinal slot portion, and a plurality of transverse slot portions; the shaft portion being rotatable to a position where the locating pegs align with the longitudinal slot portion, whereupon the shaft is longitudinally movable relative to the base member, and the shaft being rotatable to a position where the locating pegs align with the transverse slot portions, and the shaft portion is fixed relative to the base member.

19. The seat adjustment mechanism of claim 12, wherein the coupling mechanism defines coupling points for attachment to a seat, the coupling points being lower than that the upper wall of the base member.

20. The seat adjustment mechanism of claim 19, wherein the sliding plate has an upper plate portion and sliding rails, where the sliding rails are positioned vertically lower than the upper plate portion, and wherein the coupling mechanism is defined by fasteners coupled to the sliding rails.

21. A seat adjustment mechanism, comprising:
a base member having an upper wall, and a cavity positioned below the upper wall;
an adjustment mechanism comprised of a movable portion being positioned within an envelope of the cavity, and being movable longitudinally relative to the base member, the adjustment mechanism further comprising a coupling mechanism protruding though at least a portion of the base member, the coupling mechanism being coupled to and movable with the movable portion; and
an adjustment lever being coupled to a lower side of the movable portion, and is movable with the movable portion between a locked and unlocked position, allowing the adjustment mechanism to be longitudinally movable relative to the base member when in the unlocked position, and locked relative to the base member when in the locked position;
the adjustment lever comprising a shaft portion and a handle portion where the shaft portion is coupled to the lower side of the movable portion, the base member including a front lower wall and an opening positioned vertically above the front lower wall, with the handle portion protruding through the opening;
the shaft portion being rotatable about a longitudinal axis and comprises first locking elements which locate and lock the shaft portion relative to the base member and the base member further comprises second locking elements cooperable with the first locking elements;
the shaft being longitudinally movable relative to the base member, and the shaft is rotatable to a position where the first locking elements align with the second locking elements, and the shaft portion is fixed relative to the base member.

22. The seat adjustment mechanism of claim 21, wherein the movable portion is defined by a sliding plate.

23. The seat adjustment mechanism of claim 21, wherein the base member includes a front lower wall and an opening is positioned vertically above the front lower wall, and the handle portion protrudes through the opening.

24. The seat adjustment mechanism of claim 21, wherein the handle portion includes a gripping portion which is generally perpendicular to the shaft portion.

25. The seat adjustment mechanism of claim 21, wherein the first locking elements comprise one or more locating pegs on the shaft portion and the second locking elements comprise a locating slot having a longitudinal slot portion, and a plurality of transverse slot portions.

26. A seat adjustment mechanism, comprising:
a base member having an upper wall, and a cavity positioned below the upper wall;
an adjustment mechanism comprised of a sliding plate having an upper plate portion and sliding rails, where the sliding rails are positioned vertically lower than the upper plate portion, and wherein the coupling mechanism is defined by fasteners coupled to the sliding rails, the sliding plate being positioned within an envelope of the cavity, and being movable longitudinally relative to the base member;

a coupling mechanism protruding though at least a portion of the base member, the coupling mechanism being coupled to and movable with the sliding plate and the coupling mechanism defines coupling points for attachment to a seat, the coupling points being lower than that of the upper wall of the base member; and an adjusting and locking mechanism having a locked and unlocked position, allowing the adjustment mechanism to be longitudinally movable relative to the base member when in the unlocked position, and locked relative to the base member when in the locked position.

27. The seat adjustment mechanism of claim 26, wherein the adjusting and locking mechanism comprises an adjustment lever coupled to the sliding plate.

28. The seat adjustment mechanism of claim 27, wherein the adjustment lever is coupled to a lower side of the sliding plate, and is movable with the sliding plate.

29. The seat adjustment mechanism of claim 27, wherein the adjustment lever comprises a shaft portion and a handle portion.

30. The seat adjustment mechanism of claim 29, wherein the shaft portion is coupled to the lower side of the sliding plate and the handle portion protrudes through the base member.

31. The seat adjustment mechanism of claim 29, wherein the perimetral wall includes a front lower wall and the opening is positioned vertically above the front lower wall, and the handle portion protrudes through the opening.

32. The seat adjustment mechanism of claim 29, wherein the shaft portion is rotatable about a longitudinal axis and the handle portion includes a gripping portion which is generally perpendicular to the shaft portion.

33. The seat adjustment mechanism of claim 32, wherein the longitudinal axis is below the perimetral wall, and the handle portion is angled up and over the perimetral wall.

34. The seat adjustment mechanism of claim 33, wherein the shaft portion comprises first locking elements which locate and lock the shaft portion relative to the base member.

35. The seat adjustment mechanism of claim 34, wherein the base member further comprises second locking elements cooperable with the first locking elements.

36. The seat adjustment mechanism of claim 35, wherein the first locking elements comprise one or more locating pegs on the shaft portion and the second locking elements comprise a locating slot having a longitudinal slot portion, and a plurality of transverse slot portions; the shaft portion being rotatable to a position where the locating lugs align with the longitudinal slot portion, whereupon the shaft is longitudinally movable relative to the base member, and the shaft being rotatable to a position where the locating lugs align with the transverse slot portions, shaft portion is fixed relative to the base member.

* * * * *